Figure 1:
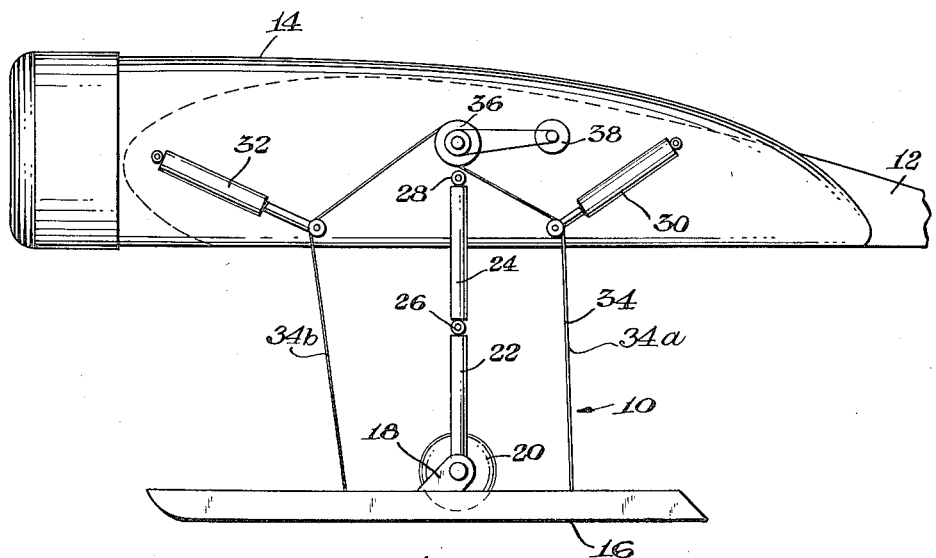

Dec. 22, 1959  T. H. McCONICA III  2,918,234
SKI RIGGING APPARATUS
Filed Jan. 13, 1956

INVENTOR.
Thomas H. McConica III
BY
Earl L. Ayers
AGENT

United States Patent Office 2,918,234
Patented Dec. 22, 1959

2,918,234

SKI RIGGING APPARATUS

Thomas H. McConica III, Clare, Mich.

Application January 13, 1956, Serial No. 558,948

4 Claims. (Cl. 244—102)

This invention relates to rigging apparatus for aircraft skis and particularly to cable rigging apparatus for use with aircraft skis.

Aircraft skis of the type used with medium and heavy weight aircraft are usually used in combination with an aerodynamic rigging system in order to prevent oscillation of the skis during the flight of the aircraft. An aerodynamic rigging system often comprises a small air foil disposed above and secured to the rear part of each ski. Presumably the air foil causes the ski to "fly" when the aircraft is in flight and thus prevent oscillation of the skis. Unfortunately, many ski rigging airfoils stall out and permit oscillation of the skis at the slower landing and takeoff speeds of the aircraft. Then, too, when skis gather a load of snow, the balance of the ski is upset and the air foil is of little or no use as a rigging device.

Because of the recognized shortcomings of aerodynamic rigging of aircraft skis, limit cables are customarily strung between the wing structure and the forward and rear parts of the skis. These limit cables control the maximum permissible pitching of the skis but cannot prevent oscillation of the skis since the cables are quite slack. Slack in the limit cables is necessary in order to permit up-and-down movement of the skis when landings or take-offs are made over rough surfaces. However, if the forward end of the ski hangs down to the extent allowed by the limit cable care must be taken to prevent the plane "stubbing its toe" on landing. Then, too, a ski in that position cannot be retracted.

Another practical disadvantage of aerodynamic rigging is that it adds additional weight to a landing gear retracting system that is already overloaded when skis are used on the aircraft. The over loading of the landing gear retraction system is especially critical when wheel skis are used on the aircraft.

Accordingly, a principal object of this invention is to provide an improved aircraft ski rigging system and apparatus which will be effective in preventing oscillation of the skis under a wide range of flight conditions.

Another object of this invention is to provide improved aircraft ski rigging apparatus which adds no additional load to the landing gear retraction mechanism of the aircraft.

In accordance with this invention there is provided cable rigging apparatus for aircraft skis which includes cables extending from a suitable tensioning device usually disposed in the wing structure or engine nacelle to both the front and rear parts of the skis. Mechanical snubbers are provided on each cable to permit up-and-down movement of the skis during takeoffs and landings over rough surfaces.

Figure 2:
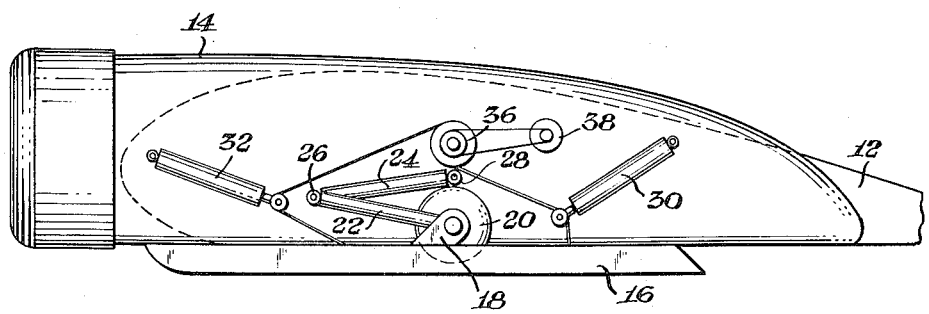

The invention, as well as additional objects and advantages thereof, will best be understood when the following detailed description is read in connection with the accompanying drawings, in which:

Figure 1 is a side elevational view, in simplified form, showing cable ski rigging apparatus in accordance with this invention as the apparatus appears when the landing gear of the aircraft is lowered, and Figure 2 is a view similar to Figure 1, but showing the rigging apparatus as it appears when the landing gear is retracted.

Referring to the drawings, there is shown aircraft ski rigging apparatus, indicated generally by the numeral 10, mounted in and beneath the wing structure 12 of an aircraft (not shown). The apparatus 10, as shown, lies between the engine nacelle 14 and the fuselage of the aircraft. Other locations for the apparatus may advantageously be used, depending only on the type of aircraft involved.

The ski 16 is attached to the carriage for the landing wheel 20 by means of the bracket 18 by which the ski 16 may be raised or lowered with respect to the landing wheel. The landing gear is shown, in simplified form, as lower and upper rod-like members 22, 24 respectively, joined by a pivot type connector 26. A second pivot type connector 28 is at the upper end of the member 24.

The cable rigging apparatus 10 includes a reel 36 which is held under controlled tension by any suitable mechanical, hydraulic, or electrical driving device 38, such as a constant torque motor, which is coupled to the reel 36. Cables 34a, 34b are wound separately on the reel 36 and are connected at their remote ends to the rear and forward parts of the ski 16, respectively. Mechanical snubbers 30, 32, coupled to the cables 34a, 34b, respectively permit a limited movement of the ski 16 (upwardly or downwardly at either end) without developing slack in either of the cables.

The operation of the cable ski rigging apparatus is as follows:

When the landing gear is in the fully extended position (as shown in Figure 1), the cable is unwound from the reel 36, providing the safety features of the conventional limit cable, but with the advantage that the cables 34a, 34b do not become slack as the landing gear is retracted as shown in Figure 2. As the landing gear is retracted, the constant torque drive on the reel 36 causes the cables to be wound on the reel. The torque applied to the reel may be controlled to an amount which compensates for the extra weight the skis add to the landing gear, thus eliminating (in most cases, at least) the extra strain on the landing gear retracting mechanism. Since the ski may weigh twice as much as the landing wheel and brake assembly, it can be appreciated that the lift provided by the reel 36 is of considerable help in retracting the landing gear when skis are installed on the aircraft.

It can readily be appreciated that with a cable rigging apparatus of the type described above, and in accordance with this invention, the aircraft ski can be maintained in a properly rigged condition regardless of the method or degree of retraction of the landing gear. By proper choice of the torque drive motor or unit 38 and the snubbers 30, 32 (or their substitute) damping may be easily accomplished with any type of ski installation.

An outstanding practical advantage of the cable ski rigging apparatus of this invention is that it may be applied to virtually every retractable landing gear system without requiring special consideration of the geometry of the retraction system.

What is claimed is:

1. Aircraft ski rigging apparatus for use with an aircraft structure having a ski which includes a forward part, a central part and a rear part and which is retractably mounted on said aircraft by means including a pivotal connection to the central part of the ski, said pivotal connection being axially perpendicular to the longitudinal axis of the ski and parallel with the horizontal transverse axis of the ski, comprising a reel secured to the aircraft structure, a tensioning device, said tensioning device being coupled to said reel, a pair of cables, said cables each having an end separately attached to and wound around said reel and each having an end attached to said ski, an end of one cable being attached to said forward part of the ski and an end of the other cable being attached to the rear part of the ski.

2. Aircraft ski rigging apparatus in accordance with claim 1, wherein means coupled to each cable is provided for permitting limited movement in one cable without developing slack in the other cable.

3. Aircraft ski rigging apparatus in accordance with claim 1, wherein a mechanical snubber is coupled to each cable.

4. Aircraft ski rigging apparatus in accordance with claim 3, wherein said reel and snubbers are disposed within the internal structure of said aircraft.

References Cited in the file of this patent

UNITED STATES PATENTS

| | | |
|---|---|---|
| 1,106,020 | Wilds | Aug. 4, 1914 |
| 1,641,700 | Sperry | Sept. 6, 1927 |
| 1,817,901 | Seversky | Aug. 4, 1931 |
| 1,887,357 | Loening | Nov. 8, 1932 |

FOREIGN PATENTS

| | | |
|---|---|---|
| 357,476 | Great Britain | Sept. 24, 1931 |
| 471,920 | France | July 23, 1914 |